UNITED STATES PATENT OFFICE.

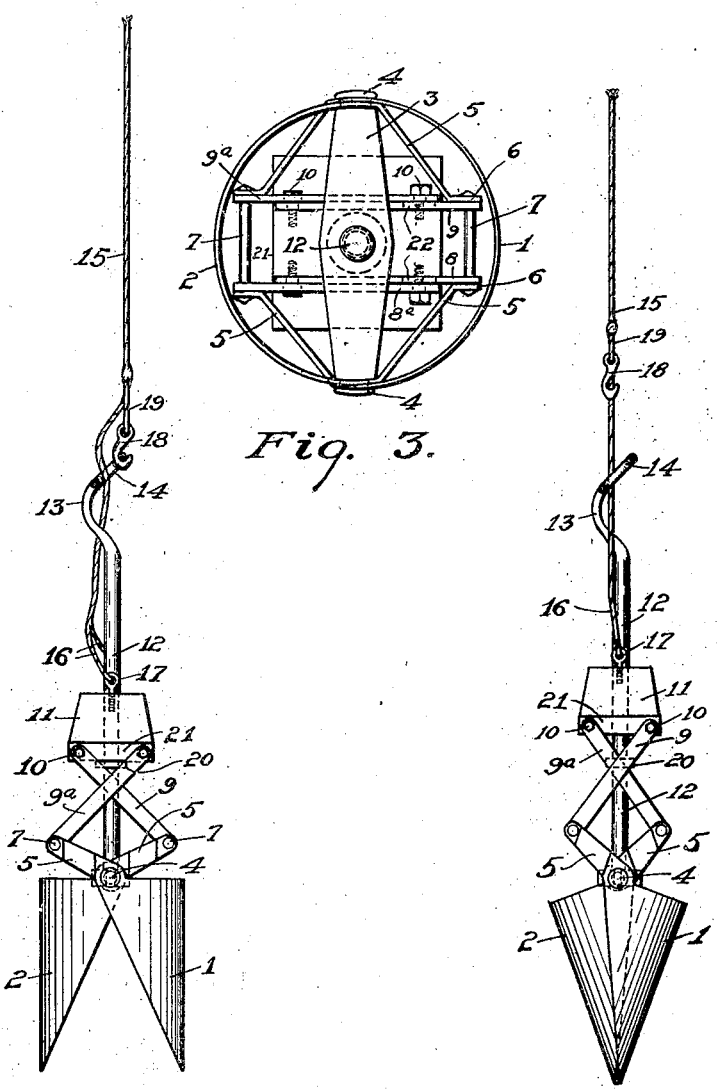

ANDREW J. CRAVEN, OF SPRUCE PINE, ALABAMA.

HOLE-DIGGING IMPLEMENT.

1,082,263.  Specification of Letters Patent.  Patented Dec. 23, 1913.

Application filed May 28, 1913. Serial No. 770,458.

*To all whom it may concern:*

Be it known that I, ANDREW J. CRAVEN, a citizen of the United States of America, residing at Spruce Pine, in the county of Franklin and State of Alabama, have invented certain new and useful Improvements in Hole-Digging Implements, of which the following is a specification.

My invention relates to a device operating on the principle of post-hole diggers but which is particularly adapted for use with a rope or cable in digging wells. There is need in this art for an implement which can be handled by a rope or cable so that a person digging a well can handle it from the surface of the ground and be free from the danger of gas in the well.

One object of the device is to provide a movable weight controlled means for setting the shovel blades in position to drop point downward when the implement is lowered.

A further object is to arrange means so that when the implement is raised the shovel blades will be forced together to hold and lift the loosened mass of earth between them.

A further object of the invention is to connect the supporting rope or cable to the implement so that while the latter is being dropped into the well, the weight is left free to move the shovels to their open position and drive them by its inertia into the ground, and when the implement is ready to be raised the pull of the rope or cable is automatically applied to force the shovels together and hold them in that position until ready to be dumped.

My invention also comprises the details of construction and arrangements of parts which are hereinafter more particularly described and claimed, reference being had to the accompanying drawings, in which:—

Figure 1 is a side elevation of my well digger shown with its parts in the position assumed when being dropped into the well. Fig. 2 is a similar view showing the position of parts when the implement is being drawn out of the well with its load of dirt. Fig. 3 is an enlarged bottom view of Fig. 1.

Similar reference numerals refer to similar parts throughout the drawings.

According to the preferred embodiment of my invention illustrated in the drawings, the apparatus comprises a pair of tapering pointed shovels 1 and 2, which converge from their semi-circular top portions down to a bottom point adapted to dig into the earth. The tops of the shovels are faced oppositely and lapped at their side edges and the lapped portions are pivoted to the ends of a heavy cross bar 3. The outer ends of the bar are reduced and turned to form axes 4, the outer ends of which are preferably riveted over as shown in Fig. 3 to hold the shovels against disengagement therefrom, but other means may be provided for holding the shovels pivotally connected to the ends of bar 3. Each shovel is provided with an integral upwardly and inwardly inclined arm 5 and these arms have their ends bent outwardly at 6 to receive a cross connecting pin 7. The cross pin which connects the arms 5 of the shovel 2 is disposed on the opposite side of the cross bar from said shovel and is connected to a pair of links 8 and 9 inclined upwardly at an acute angle to said arms 5. These links at their upper ends are pivotally connected by cap screws 10 to a weight 11, which is slidably mounted on a round metal rod 12. The arms 5 of the bucket 1 are connected by kinks $8^a$ and $9^a$, which are inclined in the reverse direction to the links 9, to the opposite side of the weight 11.

The rod 12 extends down through a center opening in the weight 11 and also through a center opening in the cross bar 3, the rod being shouldered and having its reduced end passed through the bar 3 and riveted to interlock the rod and bar rigidly together. At its upper end the rod 12 is bent at 13 like a goose neck and its upper end is provided with an eye 14 which stands substantially over and at an angle to the main body of the rod 12. The operating cable 15 is passed down through the eye 14 and provided with two ends 16 which are connected to eyes 17 either screwed in or otherwise connected to or formed as part of the weight 11. A hook 18 is connected by a short piece of a rope or cable 19 to the main body of the cable, the connection being made at such a point that, when the hook is caught in the eye as shown in Fig. 1, the implement is suspended from the cable wholly by means of the hook and the weight 11 will be free to slide down to its lower position when it rests upon a shoulder or lug 20 which is rigid on the bar 12 and may be connected thereto or formed integral therewith. When the hook 18 is released from the eye 14, the pull of the cable 15 is then direct upon the weight 11 which is thereupon raised off its seat 20 and moves the links, 8, 9, 8ª and 9ª and the pairs of arms 5, like lazy tongs, to draw the shovels 1 and 2 together, causing them to swing on their pivots 4 on the cross bar 3 and catch a load of loosened earth between them. The weight 11 is preferably provided with a narrow bottom shoulder 21 and it is to this shoulder that the links 8, 9, 8ª and 9ª are connected. Since the oppositely inclined pairs of links are crossed, provision will have to be made to prevent the links from rubbing together and to this end I space the ends of the outer links 8ª and 9ª from the sides of the portion 21 by inserting washers 22, which washers are thicker than the links 8 and 9. The cap screws 10 pivotally connect the upper ends of the several links directly to the weight and on opposite sides of the cross bar from the arms 5 to which the links are respectively connected. The seat 20 for the weight is so positioned that it will arrest the weight when the latter has opened the shovels so that they hang vertically as shown in Fig. 1. The seat, being rigid with the rod 12, serves to transfer through that rod and across arm 3, the full moment of the weight's inertia to the shovels when the implement is dropped.

While I regard the construction shown as the preferable manner of connecting the links to the weight, it is obvious that the links connected to the arms 5 on one side of the cross bar may be connected to the weight on the same side of the cross bar and that the operation of the implement would be substantially the same.

In operation, the hook 18 is caught in the eye 14 and the weight 11 then permitted to drop down onto its seat 20 and open the shovels to the position shown in Fig. 1. The digger is then dropped and when it strikes the earth at the bottom of the well or hole, the hook 18 drops out of engagement with the eye and will hang in a position to pass freely up through the eye when a pull is exerted on the cable to raise the implement. To facilitate this disengaging action on the part of the hook, the eye 14 is disposed so that the cable hangs against its inner edge, as seen in Fig. 2, and the hook is so designed and weighted that its hook end stands substantially under the projection of its eye and will freely disengage itself from the eye when the implement strikes the ground. This arrangement makes it practically impossible for the hook not to pass freely up through the eye 14 when the operator commences to pull upwardly on the cable. This will draw the weight 11 from its seat and by the lazy tongs connection described will force the shovels together to grip between them the loosened body of earth which is lifted out of the hole with the implement. The operator then grasps the eye 14 and releases the pull on the cable whereupon the weight drops onto its seat, and the shovels open automatically to discharge their contents. Before lowering the implement, the hook 18 is again caught in the eye and the parts again automatically assume the position shown in Fig. 1.

While my invention is peculiarly adapted for being raised and lowered by cable, it is obvious that it may be operated by hand, the eye 14 serving as the upper hand grip and the ends 16 of the cable or equivalent means being used to draw the shovels together.

Having thus described my invention, what I claim as new and desire to secure by Letters Patent, is:—

1. An implement of the character described comprising a rigid metal frame, a pair of depending shovels hinged to said frame and weighted to swing normally to vertical position, arms connected to said shovels, a cable suspension connected to said arms and adapted to swing the bottom ends of the shovels together, and means carried by the cable and adapted to connect to the frame-work of the implement and relieve the shovels of the pull of the cable until after the implement has struck the ground.

2. In an implement of the character described, a frame comprising a vertical shank, a pair of reversely disposed shovels pivoted to said frame and having arms projecting upwardly and beyond their pivot points, weights acting on said arms to swing the shovels to open position, means to arrest the opening movement of the shovels when they hang in vertical position, means to connect said arms to a cable so that the up pull of the cable will swing the shovels together, and a hook carried by the cable and adapted to engage and suspend said shank directly from the cable as the implement is dropped, said hook being connected to the cable at a point which will take the pull of the cable off the shovels, and being adapted to automatically disengage itself from the shank when the implement strikes the ground and the pull on the cable relaxes.

3. In an implement of the character described, a shank having a cross piece at its lower end and a cable guide at its upper end, a cable adapted to pass through said guide, a movable weight on the shank to which the cable is connected, shovels pivoted to said cross piece, pivotally connected arms which connect the weight and shovels and are arranged so that the weight acts to open the shovels, a seat on said shank for the weight which arrests its down travel when the shovels hang vertically, and a hook member connected to the cable and adapted to be connected with the shank and support the implement with the weight resting on its seat, said hook member being adapted to automatically disengage itself from the shank when the pull on the cable is relaxed, substantially as described.

4. In an implement of the character described, a shank having a cross piece at its bottom and an inclined eye at its top, a cable adapted to pass down through said eye, a hook connected to the cable and adapted to engage the eye for lowering the implement and being adapted to automatically disengage itself from the eye when the pull on the cable is relaxed, hinged weight controlled shovels mounted on the cross piece of the shank, and means connecting the shovels to the cable, which means will close the shovels together when the pull of the cable is applied thereto, substantially as described.

5. In an implement of the character described, a shank member having a goose neck at its upper end carrying a cable receiving eye, a pair of shovels hinged to the lower end of the shank and having cross upwardly inclined arms, reversely crossed links connected to said arms at their lower ends, a weight movable on said shank and connected to the upper ends of said arms, a seat on said shank for the weight, means to connect the cable to the weight, and a hook member on the cable adapted to be passed through and engage said eye and support the implement on the cable with its weight in its lower position, said hook being adapted to automatically disengage itself from the eye when the pull of the cable thereon is released and to pass up through the eye transferring the pull of the cable to said weight, substantially as described.

6. In an implement of the character described, a shank having a cable guide at its top, a cable from which the implement is suspended, a hook connected to the cable and adapted to engage the upper end of the shank for lowering the implement and being adapted to automatically disengage itself from the shank when the pull on the cable is relaxed, hinged weighted shovels mounted on the lower end of the shank, and a connection between the shovels and the cable which closes the shovels together when the pull of the cable is applied thereto, substantially as described.

7. In an implement of the character described, a frame, shovel blades hinged to the lower end of the frame to hang point down, a cable connected to the blades to close them together by an upward pull, a hook loosely connected to said cable at a point above the frame when the cable is taut, and a portion of the frame adapted to be engaged by said hook, said hook being connected to the cable when taut at a point above said portion and being adapted to drop out of engagement with the frame when the cable is relaxed and having its hook portion guarded to prevent accidental reëngagement with the frame, substantially as described.

8. In an implement of the character described, a vertical rod, a cross member connected to the bottom of the rod, scoop shaped shovels having their upper corners overlapped and pivoted to the ends of said member, a weight movable on the rod, a projection on the rod forming a seat for the weight, connections from weight to shovels to open out the latter, and means connected to both shovels and adapted to force their lower ends together as and for the purposes described.

In testimony whereof I affix my signature in presence of two witnesses.

ANDREW J. CRAVEN.

Witnesses:
  NOMIE WELSH,
  F. L. CRAVEN.